United States Patent
Beyfuss et al.

(10) Patent No.: US 6,279,231 B1
(45) Date of Patent: *Aug. 28, 2001

(54) DEVICE FOR AXIAL ATTACHMENT

(75) Inventors: Berthold Beyfuss, Kaisten; Hans-Juergen Friedrich, Koenigsberg; Peter Horling, Mainberg, all of (DE)

(73) Assignee: SKF GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,597

(22) Filed: May 18, 1999

(30) Foreign Application Priority Data

May 19, 1998 (DE) .......................... 298 09 031 U

(51) Int. Cl.[7] .................................................. B21K 53/10
(52) U.S. Cl. .......................................... 29/898.07; 29/521
(58) Field of Search ........................ 29/898.07, 898.061, 29/898.062, 898.064, 898, 465, 525, 509, 521; 72/325

(56) References Cited

U.S. PATENT DOCUMENTS

| | | | |
|---|---|---|---|
| 2,881,646 | * | 4/1959 | Farr et al. ................... 29/898.064 |
| 3,317,986 | * | 5/1967 | Sutowski ........................... 29/509 |
| 3,662,462 | * | 5/1972 | Shiflet ........................ 29/898.045 |
| 4,087,897 | * | 5/1978 | Sholefield ......................... 29/509 |
| 5,136,772 | * | 8/1992 | Rupprecht et al. ................. 29/511 |
| 5,384,948 | * | 1/1995 | Bonfilio et al. ................... 29/520 |
| 5,463,811 | * | 11/1995 | Aureli et al. ................. 29/898.046 |
| 5,513,433 | * | 5/1996 | Sumiyoshi et al. ........... 29/898.046 |
| 5,579,568 | * | 12/1996 | Hudson et al. .................... 29/509 |

FOREIGN PATENT DOCUMENTS 23 35 701 C2    7/1973 (DE).

* cited by examiner

*Primary Examiner*—S. Thomas Hughes
*Assistant Examiner*—Marc W. Butler
(74) *Attorney, Agent, or Firm*—Eugene E. Renz, Jr., PC

(57) ABSTRACT

A method for securing the outer ring of the bearing in a runner shell wherein the radius of an edge defining the seat for the bearing varies in a predetermined manner around its circumference, the steps comprising, positioning an outer ring of the bearing in the seat of the runner shell so that the edge of the runner shell overlies a circumferentially extending seating groove in the outer ring, placing a die having a forming face in engagement with the peripheral edge of the runner shell, and deforming by means of a die, the edge of the runner shell seat in a manner to displace essentially the same material around the circumference of the edge into the bearing groove, thereby producing a generally uniform force on the bearing ring around the circumference of the ring which eliminates distortion thereof.

1 Claim, 3 Drawing Sheets

DEVICE FOR AXIAL ATTACHMENT

BACKGROUND OF THE INVENTION

It is already known from DE 2,335,701 that an outer ring for a ball bearing can be pressed into a runner shell and that this can then be secured axially by wedging a ring over it.

The material of the runner shell which projects axially beyond the seating surface is thus axially deformed, i.e., flattened and bent over, and thus a certain amount of material is pushed against the outer ring in the radial and axial directions. As a result, a reliable, positive form-locking connection is achieved.

When runner shells are drawn (formed by pressing a die into a flat sheet of metal) the resulting edge material from which the bent over wedge is formed is not uniform in thickness, axial height, and radius of curvature. In prior art, the ring shaped die uniformly compresses the edge material around the outer ring of the bearing causing non-uniform stresses on the outer ring of the bearing leading to unallowable deformation of the outer ring pushing it out of its circular shape. This deformation leads to premature failure of the roller bearing. The way to prevent this unallowable deformation is to uniformly deform edge material such that the stresses and hence deformation is uniform around the outer ring.

This invention solves that problem by making the ring shaped forming or wedging surface or edge deforming die non-uniform in height so that during the edge forming process the same amount of material and thus equal stresses are formed around the circumference of the outer ring of the bearing

SUMMARY OF THE INVENTION

The task of the invention is to create a device for axial attachment of the type cited above which does not cause any deformation of the roller bearing even when the seating conditions are not uniform.

The task is accomplished in that the axial height of the wedging surface of the ring-shaped die is adapted to the circumference of the housing material in cases where the degree to which this material projects varies around the circumference. In other words, the die face configuration is selectively varied around its circumference so that the material displaced to form the bead is generally the same around the circumference and thus generally uniform. Equal stresses are produced which prevents undesirable distortion of the outer ring during the edge forming process.

As a result of the adaptation of the ring-shaped die, this die is seated uniformly around the circumference of the material to be deformed even before the deformation occurs. As a result, there are no sections of material which are compressed to a greater extent than any other areas. Equal radial forces thus act advantageously at every point around the circumference on the outer ring to be attached.

BRIEF DESCRIPTION OF THE DRAWINGS

These and other objects of the present invention and various features and details of the operation and construction thereof are hereinafter more fully set forth with reference to the accompanying drawings, wherein.

DESCRIPTION OF THE METHOD AND SYSTEM

Figure 1:
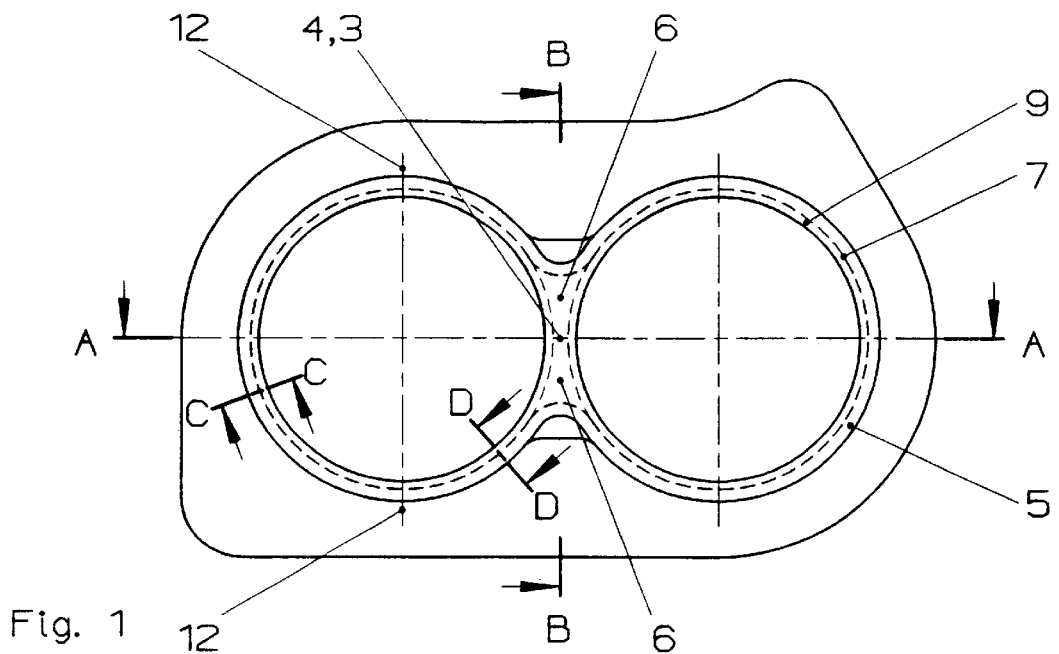
FIG. 1 shows a plan view of a bearing plate with closely adjacent seating surfaces for roller bearings.

Referring now to the drawings and particularly to FIG. 1 thereof, the bearing plate shown in the figures is produced by deep-drawing a flat blank. The steel sheet blank is first drawn into its external shape and then drawn again to produce the holes in the centers of the roller bearing seats.

Figure 2:
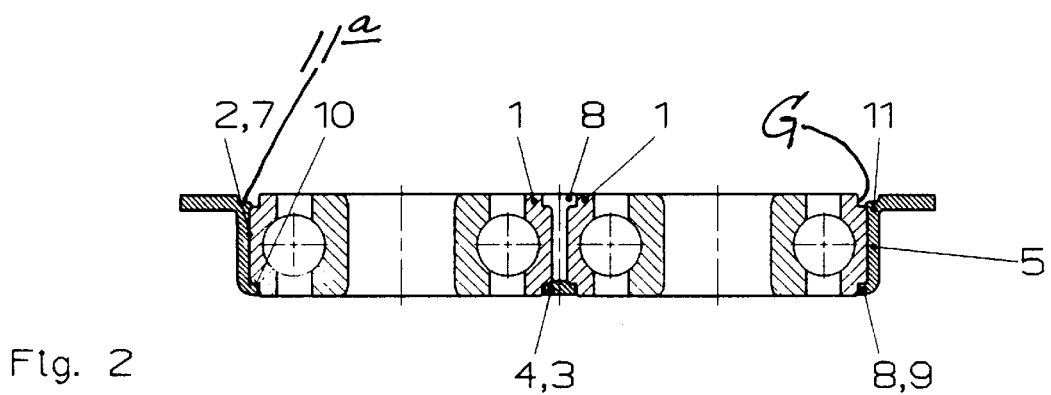
FIG. 2 shows a cross section along line A—A of FIG. 1 with the roller bearings installed.
Figure 3:
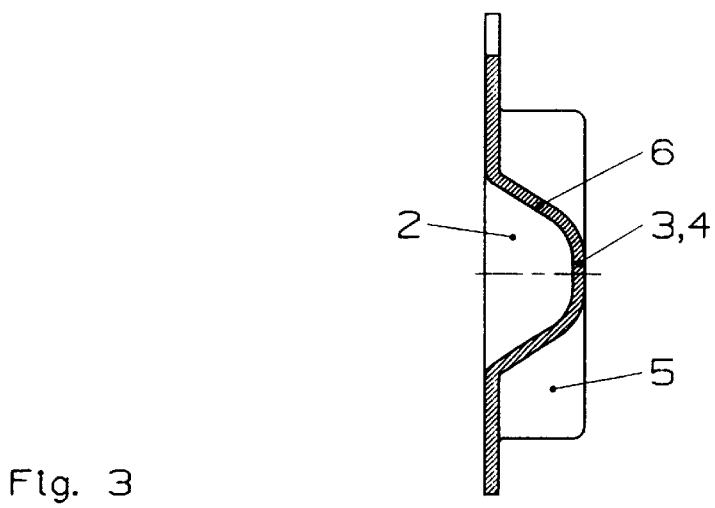
FIG. 3 shows a cross-sectional profile along line B—B of FIG. 1.

Because outer rings 1 are nearly touching, there is no longer any more material present in the area between their lateral surfaces 2 at the narrowest point. What remains is merely a section of web 3 in area 4 of the bearing plate, which is still flat, as can be seen in FIG. 2. Proceeding from this weakest point, however, the axial width increases continuously until it reaches the full width of deep-drawn, shell-shaped section 5, as can be seen in FIG. 2. As a result, arched or folded transition regions 6 of great rigidity are obtained, which keep seating surfaces 7, which are interrupted at the weakest point, dimensionally stable.

As a result of circular, cutaway areas 8 in outer rings 1, web section 3 can be wider, which increases the dimensional stability. Cutaway area 8 also accepts a flange-shaped edge section 9 of shell-like section 5. This flange-like section forms axial contact surfaces 10 for the associated outer rings 1.

Corresponding cutaway areas 8 on the other side of outer rings 1 allow parts 11 of the material of the bearing plate to be pushed in to define a rib 11a engaging in a circumferential groove G in the outer ring and produce a positive, form-locking attachment of outer rings 1.

Figure 4:
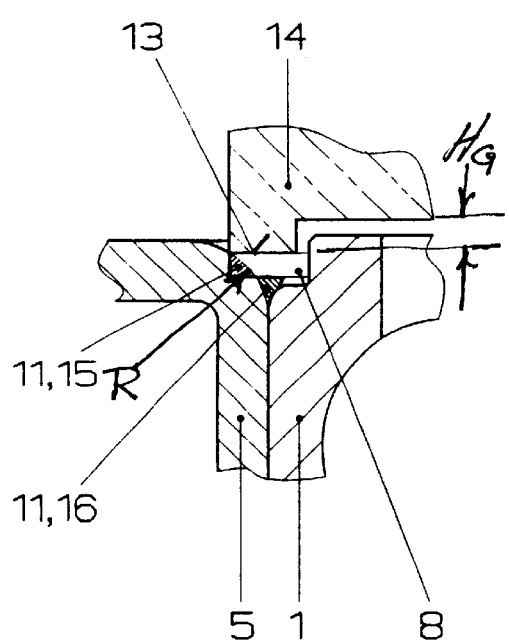
FIG. 4 shows a partial longitudinal cross section along line C—C of FIG. 1.

It has been found that as a result of the special deep-drawing process with web section 3 described above, the relationships which are obtained in the transition region from the flat blank to cylindrical seating surfaces 7 differ around the circumference. For example, on the left semi-circle extending between plane 12—12, the shaped radius R is uniform (see FIG. 4). As the circle proceeds from plane 12—12 toward web section 3, however, the radius designated Rs becomes smaller, and the volume of projecting material becomes larger (see FIG. 5). To avoid differences in the degree to which the material to be deformed is compressed in individual areas and to produce generally uniform circumferential stresses from the die on the outer ring 1, the axial height of wedging surface 13 of ring-shaped die 14 is adapted to the height of the material before the wedging operation. More specifically, the axial height of the die is varied around the circumference and is a greater depth or height Hg in the semi-circle right of the plane 12—12 than the height Hs in the semi-circle left of the plane 12—12. In this phase, therefore, ring-shaped die 14 lies uniformly on the material to be deformed all the way around, except in the material-free area near web section 3. This can be seen in the partial developed view shown to FIG. 6. Whereas the wedging surface 13 overlying left of the plane 12—12 extends in a radial plane, the height of the wedging surface 13 in the semi-circle overlying the right side of plane 12—12 decreases continuously in order to adapt to the height of the material.

As a result, the material is subjected to generally the same degree of compression all the way around, and thus the volumes which are deformed are nearly the same around the entire circumference. These volumes thus exert uniform radial loads on the outer ring and thus clamp it uniformly in place.

Figure 5:
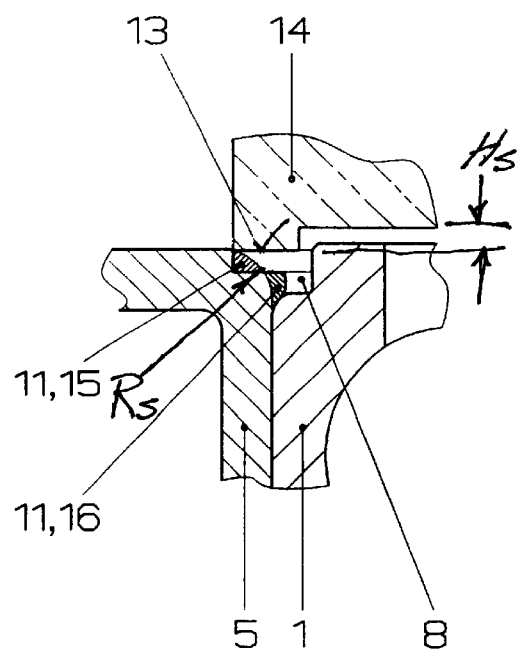
FIG. 5 shows a partial longitudinal cross section along line D—D of FIG. 1.
Figure 6:
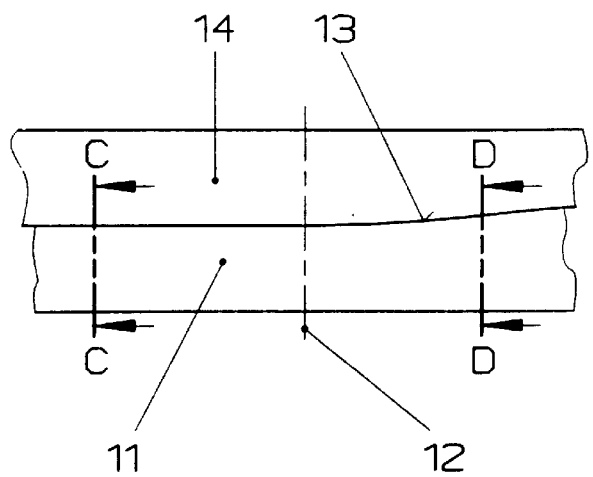
FIG. 6 shows the contact line between the ring-shaped die and the material to be wedged in a developed view extending between cross sections C and D of FIG. 1.
Figure 7:
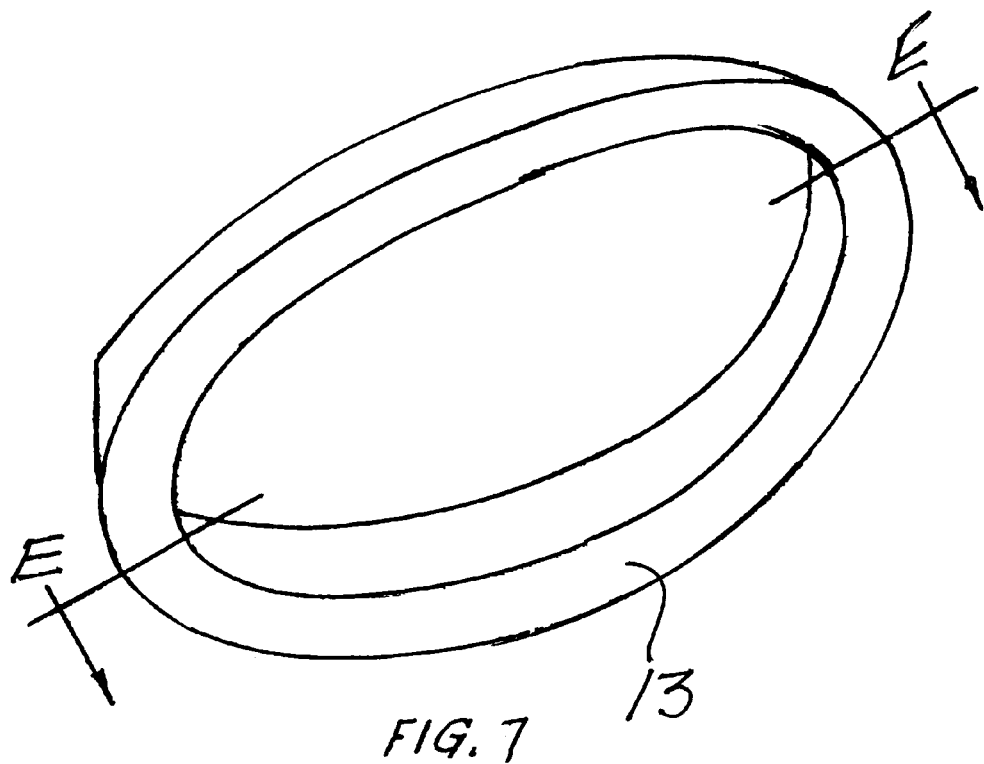
FIG. 7 is a perspective view of the ring-shaped die for the method of the present invention.
Figure 8:
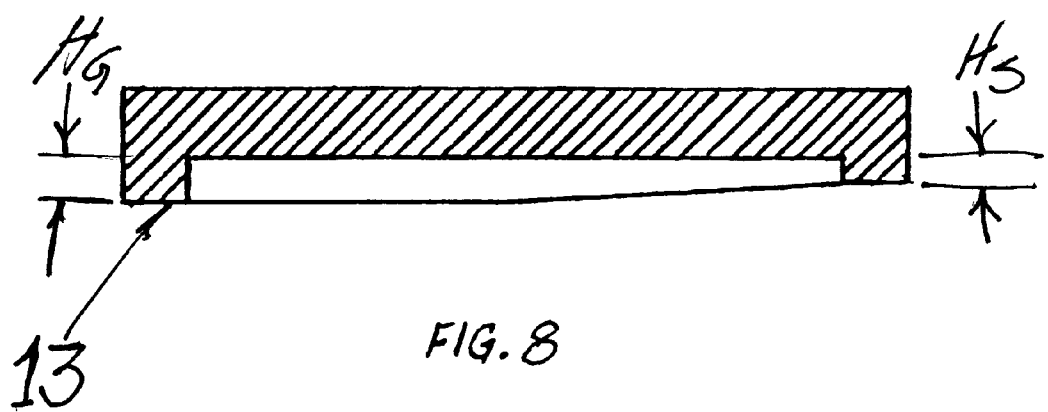
FIG. 8 is a sectional view of FIG. 7 taken on lines E—E.

This is shown in FIG. 5, where the radius Rs of the edge is small and thus more material projects. In this case, therefore, wedging surface 13 is set higher than in FIG. 4, where the radius R of the edge is larger and less material projects. Since less material projects, wedging surface 13 is laid or set lower. In both cases, approximately the same volume 11 of material is deformed from 15 to 16, as a result of which it can be expected secondarily that the degree to which the material is compressed will be the same in these areas.

Even though a particular embodiment of the invention has been illustrated and described herein, it is not intended to limit the invention and changes and modifications may be made therein within the scope of the following claims for example.

What is claimed is:

1. A method for securing an outer ring of a bearing in a runner shell having a contact surface at one end and an upper edge which varies in thickness, axial height and radius of curvature in a predetermined manner around its circumference, the steps comprising:

positioning an outer ring of the bearing in the runner shell so that an axial end of the outer ring scats on the contact surface of the runner shell;

placing a ring-shaped die having a wedging surface with a predetermined axial height about its circumference which varies in relation to the variations in thickness, axial height and radius of curvature of the upper edge of the runner shell in engagement with the upper edge of the runner shell; and deforming the upper edge of the runner shell by means of the die in a manner to form a bead wherein the material displaced to form the bead is generally the same and uniform around the circumference thereby producing a generally uniform force on the bearing around the circumference of the ring which eliminates distortion thereof.

* * * * *